DUAL MODE MANUAL CONTROLLER
Filed April 1, 1968 2 Sheets-Sheet 1
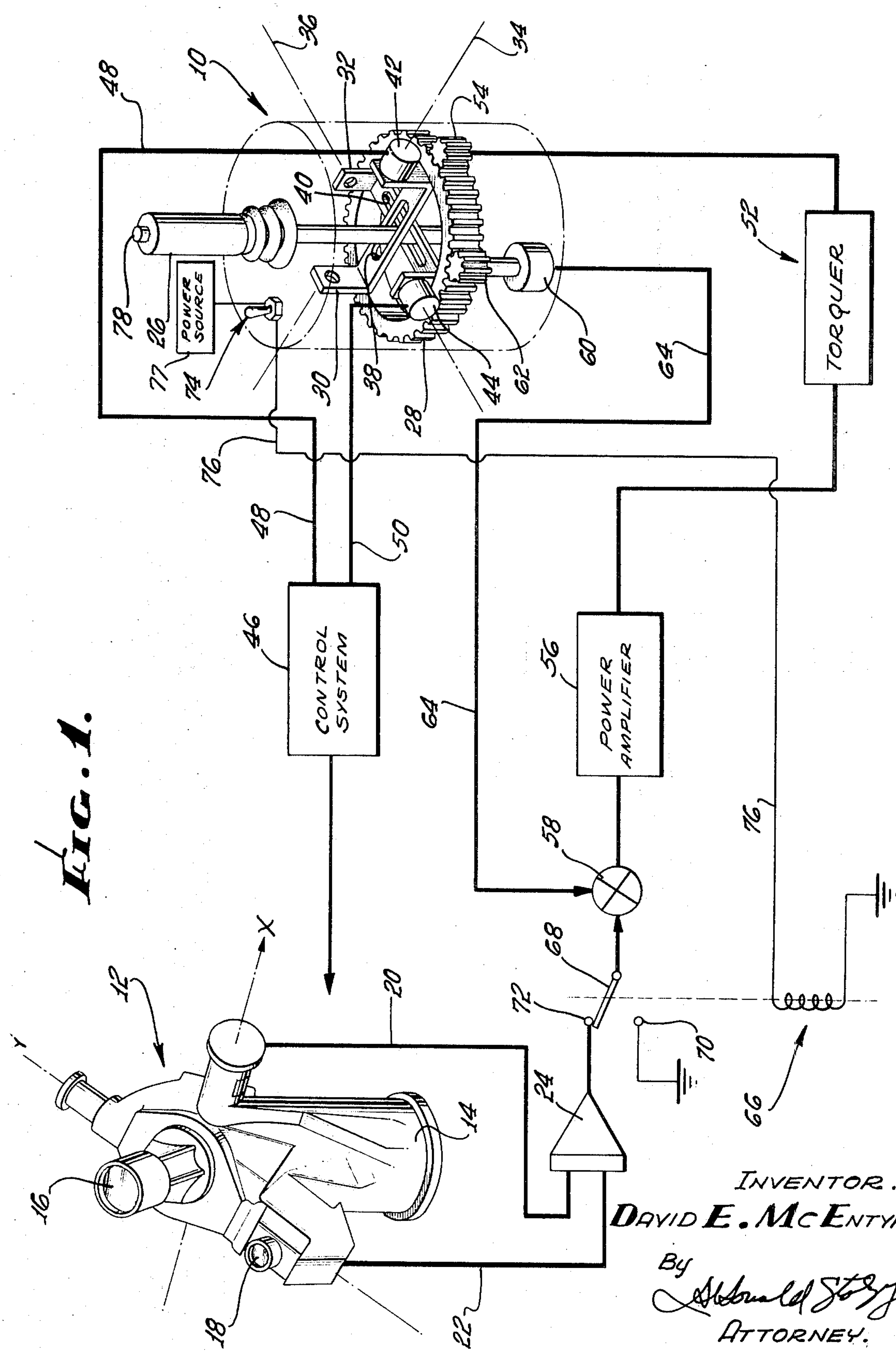

DUAL MODE MANUAL CONTROLLER
Filed April 1, 1968 2 Sheets-Sheet 2
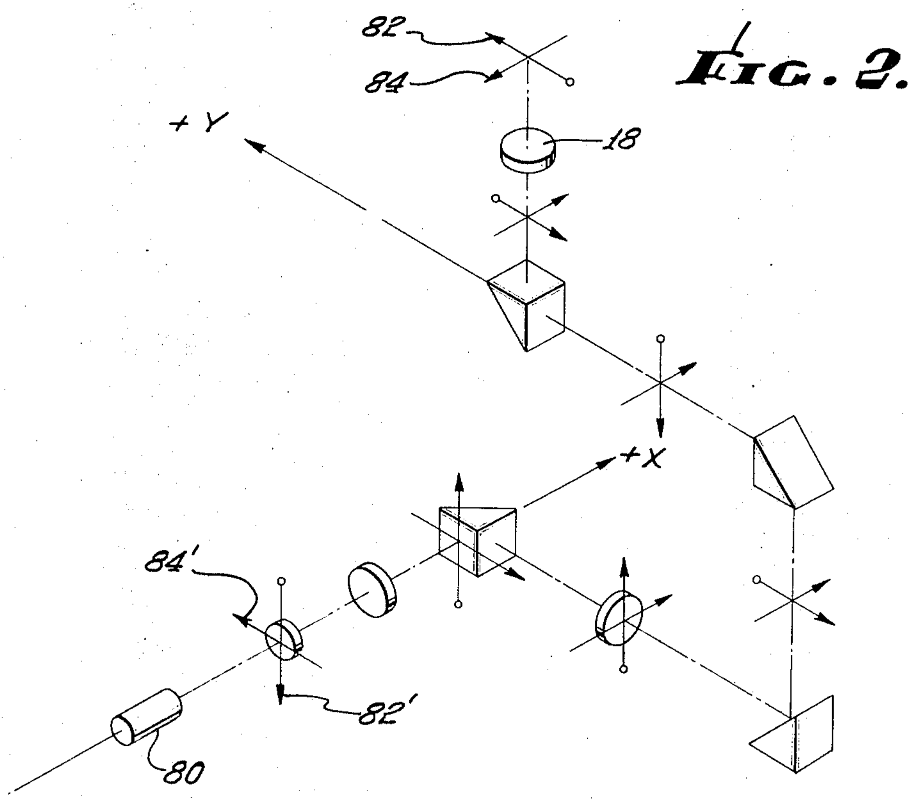
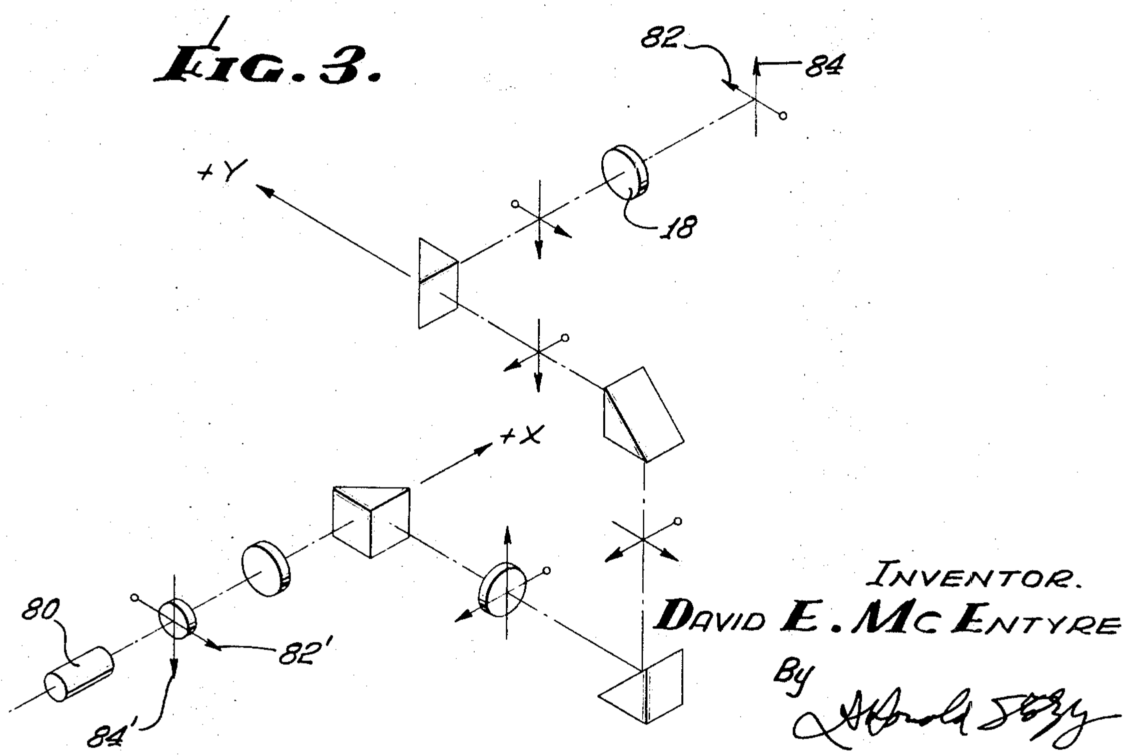
INVENTOR.
DAVID E. McENTYRE
By [signature]
ATTORNEY.

United States Patent Office 3,544,217
Patented Dec. 1, 1970

3,544,217

DUAL MODE MANUAL CONTROLLER

David E. McEntyre, Simi, Calif., assignor to International Telephone and Telegraph Corporation, New York, N.Y., a corporation of Delaware Filed Apr. 1, 1968, Ser. No. 717,807
Int. Cl. G01p 3/36
U.S. Cl. 356—29 9 Claims

ABSTRACT OF THE DISCLOSURE

Manual control apparatus for target acquisition in a gimbal-mounted optical tracking telescope. Manual control of the telecope movement about its X and Y gimbal axes is effected by moving a joystick to pivot a pair of output members about respective horizontal, normal axes which are referenced to the telescope mount for coarse, visual alignment of the telescope in a first mode of operation, and are variably referenced in response to the telescope gimbal angles in a second mode where fine alignment is achieved through an optical guidescope to compensate for confusing image reversals in the guidescope optics.

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

The present invention relates to tracking systems wherein the tracker is first visually aligned with the object to be tracked by manipulation of a control device such as a joystick, and when thus aligned with the target is set for automatic tracking. An example of such a tracking device is an electro-optical tracker which includes a gimbal-mounted telescope adapted to track a point source of light, such as an aircraft-mounted light source. The conventional means for manually aiming such a tracking telescope to achieve automatic tracking acquisition is a linear output joystick type manual controller having actuation axes which are referenced to the telescope mount. The telescope is first brought into coarse alignment with the target by direct visual sighting of the operator. However, to achieve sufficiently accurate alignment with the target for acquisition of the automatic tracking mechanism, the operator must view the target through an optical guidescope which has an objective that is boresighted to the tracking telescope but has a fixed eyepiece. During this final stage of alignment to achieve acquisition the operator manipulates the manual controller to center the target within a pattern scribed on a reticle in the guidescope.

To provide the operator with a stationary eyepiece as well as a boresighted guidescope requires complex optics involving numerous image reversals. The result is that during the final stage of alignment wherein the target is viewed through the guidescope, the apparent direction of movement of the target in the guidescope becomes for all practical purposes unrelated to the orientation of the telescope mount and of the controller actuation axes, and consequently the operator generally becomes confused in his efforts to command corrective gimbal motions on the basis of what he sees in the guidescope. The net result is that the final phase of acquisition tends to be difficult and time-consuming, and involves undesired trial and error in the movement of the control stick.

SUMMARY OF THE INVENTION

In view of these and other problems in the art, it is an object of the present invention to provide a novel dual mode manual control system for alignment of a tracking telescope wherein the controller actaution axes are referenced to the mount itself in the first mode for coarse alignment of the telescope with the object through direct visual sighting by the operator, and the controller, actuation axes are variably referenced in response to the telescope gimbal angles in the second mode for fine alignment through an optical guidescope which is boresighted to the tracking telescope, this variation of the controller actuation axes in the second mode being such that the otherwise confusing image reversals in the guidescope optics are compensated for and the natural responses of the operator to a misaligned target result in the desired corrective mount motions for centering the target in the guidescope reticle pattern.

Another object of the invention is to provide a dual mode manual controller of the character described for acquisition of a gimbal mounted tracker, wherein the controller includes a pair of joystick operated output members that are pivotable about respective horizontal axes that are normal to each other to adjust a pair of controller output potentiometers, these axes being in a fixed angular position of orientation about the generally vertical axis of the joystick that is referenced to the tracker mount in the first or "mount" mode for direct visual coarse alignment, and being physically rotated or resolved to different angular positions about the generally vertical axis of the joystick in response to tracker gimbal angle variations in the second, fine alignment mode wherein the optical guidescope is employed.

Another object of the invention is to provide a dual mode manual controller of the character described wherein the operation is quickly and easily shifted from the first mode to the second mode by actuation of an electrical switch.

A further object of the invention is to provide a dual mode manual controller of the character described in which the controller output members are mounted on servo controlled turntable means rotatable about the generally vertical axis of the control stick, the turntable means in the first mode being servoed to a stationary position in which the actuation axes are referenced to the mount of the tracker, and being servo-controlled in the second mode in response to the difference between the Y and X gimbal angles of the tracker, servo operation in this second mode being controlled by the difference between the output signals of linear potentiometers associated with the Y and X gimbals of the tracker.

A still further object of the invention is to provide a dual mode manual controller for an electro-optical tracker which includes controller output potentiometers that are non-linear to permit the operator to command varying rates of telescope mount motion depending upon the amount of control stick throw, with a variation ranging from a precise control of very small rates, on the order of about 5 arc seconds per second, to a large slew rate on the order of about 10 degrees per second.

Further objects and advantages of the present invention will appear during the course of the following part of the specification, wherein the details of construction and modes of operation of a presently preferred embodiment are described with reference to the accompanying drawings, wherein:

BRIEF DESCRIPTION OF THE DRAWINGS

FIG. 1 is a diagrammatic view illustrating the present invention, illustrating the tracking telescope and manual controller in perspective, and diagrammatically illustrating the electrical components of the system.

FIG. 2 is a diagrammatic view illustrating the complex guidescope optics oriented with the guidescope objective directed vertically upwardly; i.e., for the gimbal positions $X=0°$ and $Y=0°$.

FIG. 3 is a diagrammatic view of the guidescope optics similar to FIG. 2, but with the guidescope objective rotated 90° about the Y gimbal axis so that the guidescope objective is directed horizontally parallel to the X gimbal axis; i.e., with the gimbal positions $X=0°$ and $Y=90°$.

DETAILED DESCRIPTION

Referring to the drawings, and at first particularly to FIG. 1 thereof, the numeral 10 generally designates the manual controller, while the numeral 12 generally designates the gimbal-mounted tracking telescope which is adapted to automatically track a moving point source of light, as an aircraft-mounted light source, after having first been manually aligned with this target by manipulation of the manual controller 10. The telescope 12 includes a fixed base 14 and has both a tracking telescope objective 16 and an optical guidescope objective 18, these two objectives looking in the same direction and being fixed relative to each other, while being movable about the two gimbal axes X and Y shown in phantom lines in FIG. 1. The guidescope objective 18 forms a part of an optical guidescope which is boresighted to the tracking telescope, yet which includes an eyepiece which is fixed relative to the base 14 of the telescope through which the operator looks during the second or fine alignment phase of acquisition.

A pair of linear potentiometers are coupled to the X and Y gimbal shafts, respectively of the telescope 12, and provide electrical output signals to respective output conductors 20 and 22. Thus, the signal provided to output conductor 20 from the X gimbal potentiometer is proportional to the X gimbal angle, while the signal provided to the conductor 22 by the Y gimbal potentiometer is proportional to the Y gimbal angle. The X and Y gimbal potentiometer output conductors 20 and 22 are connected to the input of a differential amplifier 24 which provides an output signal corresponding to the difference between the Y and X gimbal potentiometer outputs; i.e., the output of differential amplifier 24 is proportional to $Y-X$, where X equals the X gimbal angle and Y equals the Y gimbal angle.

Referring now particularly to the manual controller unit 10, this includes a control stick 26, commonly referred to as a "joystick" which in its neutral position extends vertically upwardly from a universal pivotal mounting. Concentrically arranged about the joystick 26 is a horizontal ring gear 28 which functions as a turntable. A pair of U-shaped brackets 30 and 32 are pivotally mounted on the ring gear 28 about respective horizontal axes 34 and 36 which are at right angles to each other and lie in a common horizontal plane. The brackets 30 and 32 have respective elongated slots 38 and 40 therein which are parallel to the respective axes 34 and 36, the joystick 26 extending upwardly through the slots 38 and 40 so that pivotal movement of the joystick from its neutral vertical position will cause a combination of pivotal movements of the brackets 30 and 32.

Controller output potentiometers 42 and 44 are connected to the respective brackets 30 and 32 on the respectives axes 34 and 36 so as to provide controller output signals to a control system 46 for driving the telescope mount through respective controller output conductors 48 and 50. The controller output potentiometers 42 and 44 are specially tapered non-linear cubic potentiometers which, for small angular movements of the joystick 26 from its neutral vertical position permit precise control of small rates of angular movement of the tracking telescope about its gimbal axes, while for relatively large angular movements of the joystick 26 from its neutral vertical position permit a rapid slew rate of the tracking telescope about its gimbal axes. For example, with such specially tapered cubic controller output potentiometers 42 and 44, small rates of angular movement of the tracking telescope about its gimbal axes on the order of about 5 arc seconds per second can be achieved, as well as large slew rates on the order of about 10° per second.

The angular position of the ring gear 28 with respect to the telescope mount, and hence the angular positioning of the controller actuation axes 34 and 36 with respect to the telescope mount, is adjusted by means of a torquer 52 which drives the ring gear 28 by means of a spur gear drive 54. Torquer 52 is electrically energized by a power amplifier 56 having an input 58. A follow-up potentiometer 60 is connected to the ring gear 28 through a gear 62, and the follow-up potentiometer 60 is electrically connected to the input 58 of the power amplifier 56 through an electrical connection 64.

A relay 66 has a movable contact 68 which, in one position of the relay electrically connects the power amplifier input 58 to a ground contact 70, and in the other position of the relay electrically connects the power amplifier input 58 to a contact 72 which is connected to the output of the differential amplifier 24.

A resolver mode switch 74 is mounted on the manual controller unit 10, and is electrically connected to the relay 66 by a suitable electrical connection 76. Further, a conventional power source 77 is connected to the switch 74. When the resolver mode switch 74 is in its "mount" mode position, the relay 66 is actuated so that its movable contact 68 connects the power amplifier input 58 to the ground contact 70; while movement of the switch 74 to the "scope" mode position causes the movable relay contact 68 to connect the power amplifier input 58 to the differential amplifier output contact 72. The switch 74 is also electrically connected to the controller output potentiometer conductors 48 and 50 so as to reverse the potentiometer outputs when the switch 74 is moved from the "mount" mode position to the "scope" mode position.

A mode selector switch 78 is disposed at the free end of the joystick 26, and is electrically connected to the system so that when the system is connected for manual control, depression of the switch 78 releases complete control of the mount to the automatic tracking mode; or when the system is connected for automatic tracking, depression of the switch 78 switches the system back to manual control.

FIGS. 2 and 3 of the drawings diagrammatically illustrate typical guidescope optics for two telescope gimbal positions. Such relatively complex optics are required in order to provide a fixed eyepiece 80 for the operator, while the guidescope objective 18 is gimbal-mounted to point in the same direction as the telescope objective 16. To illustrate the numerous image reversals which are involved in these guidescope optics, two object arrows 82 and 84 are shown in each of FIGS. 2 and 3 arranged at right angles to each other and in a plane normal to the axis of the guidescope objective 18. The resulting images of these respective object arrows 82 and 84 which are seen through the eyepiece 80 are designated 82' and 84', and the number of image reversals between the object arrows 82 and 84 and the respective images 82' and 84' will vary for different X, Y gimbal angles.

In FIG. 2, both the X and Y gimbal angles are 0°, while in FIG. 3 the X gimbal angle is 0° and the Y gimbal angle is 90°. This simple rotation of the guidescope objective axis through 90° about the Y axis results in a rotation of the images 82' and 84' 90° about the X gimbal axis along which the fixed eyepiece 80 is directed, which is highly confusing to the operator. It will thus be apparent that if the controller actuation axes were referenced to the mount itself while the operator was attempting to accomplish fine alignment through the guidescope, the operator could easily become confused in his efforts to command corrective gimbal motions on the basis of what he sees in the guidescope. It is for this reason that in the second or "scope" mode of operation of the present invention, the ring gear 28, and hence the controller actuation axes 34 and 36, are automatically adjusted by the torquer 52 in accordance with the Y—X differential angle signal furnished from the differential amplifier 24 to the power amplifier 56. This rotation of the controller actuation axes is such that natural responses of the operator to a misaligned target result in the desired corrective mount motions; i.e., motions that bring the target toward the center of the reticle pattern in the optical guidescope. It can be shown that the magnitude and direction of rotation of the controller actuation axes 34 and 36 about the control stick 26 to achieve this natural response condition in the "scope" mode may be simply expressed by the relation:

$$\theta = Y - X$$

where: $\theta$=angular rotation of the controller actuation axes 34 and 36 (i.e., of the controller output potentiometers 42 and 44) from reference position; $X$=X gimbal angle; and $Y$=Y gimbal angle.

The reference position of the controller actuation axes 34 and 36 is that maintained during the first or "mount" mode of acquisition wherein coarse alignment of the telescope is achieved through direct visual sighting by the operator. With the controller actuation axes 34 and 36 in this reference position, the axes 34 and 36 are referenced to the mount itself. Thus, in the first or "mount" mode, should the operator wish the mount to point to his right, he simply moves the controller stick 26 to the right; if he wishes the mount to point to his left, he simply moves the stick 26 to the left. Similarly, motion of the stick 26 toward or away from the operator results in telescope rotation toward or away from the operator, respectively. With the resolver mode switch 74 in the "mount" mode, the movable contact 68 of relay 66 is positioned to disconnect the output of differential amplifier 24 from the power amplifier 56, thus effectively open-circuiting the outputs of the X and Y gimbal potentiometers of the telescope mount, and connects the input of the power amplifier 56 to ground. The ground causes the power amplifier 56 to energize the torquer 52 so as to servo the ring gear 28 to the stationary reference position for the "mount" mode.

When the resolver mode switch 74 is shifted to the "scope" mode position, the relay 66 is moved to the position illustrated in FIG. 1, wherein the movable contact 68 connects the output of differential amplifier 24 to the input 58 of power amplifier 56. Thus, the power amplifier 56 receives an input signal proportioned to the $Y-X$ gimbal angle difference in the mount. The power amplifier 56 excites the torquer 52 to cause rotation of the ring gear 28 and hence of the controller actuation axes 34 and 36 about the control stick 26. Also moved as a result of this rotation is the follow-up potentiometer 60, the output of which is fed back through connection 64 to the power amplifier input 58. Motion of the ring gear 28 continues until the follow-up potentiometer feedback voltage equals the input voltage. Should the operator actuate the control stick 26 so as to cause the amount to move, corresponding changes in the X and Y gimbal angles occur, thereby changing the differential angle signal furnished to the power amplifier 56, which causes a resulting change in the position of rotation of the ring gear 28 and hence of the controller actuation axes 34 and 36, which results in a modified signal from the controller 10 to the mount drive control system 46. It will thus be seen that the controller system of the present invention is a closed loop when in the "scope" mode.

Because of the particular optics of the guidescope that is employed, when the controller is switched from "mount" mode to "scope" mode, in addition to re-orientation of the controller actuation axes 34 and 36 in response to the $X-Y$ gimbal angle difference, a further orientation change may be desired as between the two actuation axes 34 and 36 themselves. Thus, with guidescope optics as illustrated in FIGS. 2 and 3, achievement of full correction from the "mount" mode to the "scope" mode additionally includes a reversal of the controller output potentiometer conductors 48 and 50 to the control system 46. Suitable electrical connections (not shown) for this purpose are provided between the resolver mode switch 74 and the controller output potentiometer conductors 48 and 50.

In order to achieve acquisition, the operator first places the resolver mode switch 74 in the "mount" mode position and, by direct visual observation, manipulates the control stick 26 to rotate the tracking telescope to a point within about a 5° cone of the target, which may be an aircraft-mounted light source. The operator may command large or small rates of mount motion depending upon the amount of control stick throw because of the special non-linear controller output potentiometers 42 and 44. When the control stick 26 is in its neutral, vertical position, the tracking telescope is stationary, but when the control stick is tilted from this vertical position, the manual mount control will drive the telescope continuously at a speed dependent upon the angular position of the control stick.

As the target is approached in this "mount" mode by manipulation of the control stick 26, the operator periodically views through the guidescope eyepiece looking for the target to appear. When the target appears in the guidescope, the operator, with his free hand, quickly actuates the resolver mode switch 74 to switch from "mount" mode to "scope" mode, and then proceeds to manipulate the controller according to where the target appears in the guidescope. Should the target appear, for example, at 45° in the first quadrant, the operator would move the control stick to the right and away from himself from the stick position he then held. Because of the complex optical path in the guidescope, the aircraft carrying the light source may often appear at odd attitudes, as for example, upside down. This is quickly and easily disregarded by the operator as being insignificant, and in practice has proved to be no problem in the acquisition procedure.

The operator then continues his manipulation of the control stick 26 until the target light source is centered within a specified reticle pattern, at which time he depresses the mode selector switch 78 on the control stick 26 to release complete control of the telescope mount to the automatic tracking mode. Return to the manual mode may be achieved when desired by again depressing the mode selector switch 78.

Ring gear 28 illustrates only one type of a possible implementation of the invention. Other types such as a direct drive torquer may be used.

While the instant invention has been shown and described herein in what is conceived to be the most practical and preferred embodiment, it is recognized that departures may be made therefrom within the scope of the invention, which is therefore not to be limited to details disclosed herein, but is to be accorded the full scope of the claims so as to embrace any and all equivalent devices.

What is claimed is:

1. In a tracking system having a gimbal mounted tracker, an optical guidescope movable with the tracker, a selectively operable manual controller for target acquisition including a control stick universally pivotable from a neutral position and a pair of output members pivotal by movement of said stick about respective actuation axes generally normal to each other and to the stick in its neutral position, and a drive connection between said output members and the tracker for pivoting the tracker about its gimbal axes in response to pivotal movements of said output members; turntable means rotatable about the general axis of the control stick upon which said controller output members are pivotally monuted, selectively operable first mode positioning means connected to said turntable means for establishing a predetermined fixed angular position of orientation of said actuation axes referenced to the tracker mount for coarse alignment of the tracker with a target by direct visual observation, and selectively operable second mode positioning means connected to said turntable means for varying the angular position of orientation of said actuation axes from said fixed angular position in response to variations in the tracker gimbal angles for fine alignment of the tracker with a target by observation through the guidescope.

2. The invention as defined in claim 1, wherein said controller output members comprise non-linear output potentiometers having a rate of change of control signal output which increases with increased deflection of the control stick from its neutral position.

3. The invention as defined in claim 2, wherein said output potentiometers are substantially cubic potentiometers.

4. The invention as defined in claim 1, wherein the tracker is mounted on X and Y gimbals, and said second mode positioning means varies the angular position of orientation of said actuation axes from said fixed angular position in response to the difference between the Y and X gimbal angles of the tracker.

5. The invention as defined in claim 1, wherein said first and second mode positioning means include a common servo system connected to said turntable means.

6. The invention as defined in claim 5, wherein said servo system is electrically operated and includes electrical input means, a first mode electrical control source of fixed electrical potential, a second mode electrical control source of variable electrical potential, and switch means connected to said servo input means and to said first and second mode electrical control sources, said switch means being selectively movable between a first mode position wherein said first mode electrical control source is connected to said servo input means to control servo operation and a second mode position wherein said second mode electrical control course is connected to said servo input means to control servo operation.

7. The invention as defined in claim 6, wherein the tracker is mounted on X and Y gimbal shafts, and wherein said second mode electrical control source includes X and Y linear potentiometers coupled to the respective X and Y gimbal shafts so as to provide output signals substantially proportional to the respective X and Y gimbal angles of the tracker, and a differential amplifier having an input connected to said X and Y potentiometers and an output selectively connectable by said switch means to said servo input means, said differential amplifier being connected so that its output signal is substantially proportional to the difference between said Y and X potentiometer output signals.

8. The invention as defined in claim 7, wherein said first mode electrical control source comprises a ground electrical connection.

9. The invention as defined in claim 7, wherein said turntable means comprises a ring gear, and said servo system includes a power amplifier having said servo input means as its input, a torquer excited by said power amplifier and having an output gear member drivingly coupled with said ring gear, and a follow-up potentiometer driven by said ring gear and having an output connected to said power amplifier input.

References Cited

UNITED STATES PATENTS 3,352,196 11/1967 Hammond -------- 356—29 X

RODNEY D. BENNETT, Jr., Primary Examiner

M. F. HUBLER, Assistant Examiner

U.S. Cl. X.R.

244—3.13, 3.16